United States Patent Office 3,250,341
Patented May 10, 1966

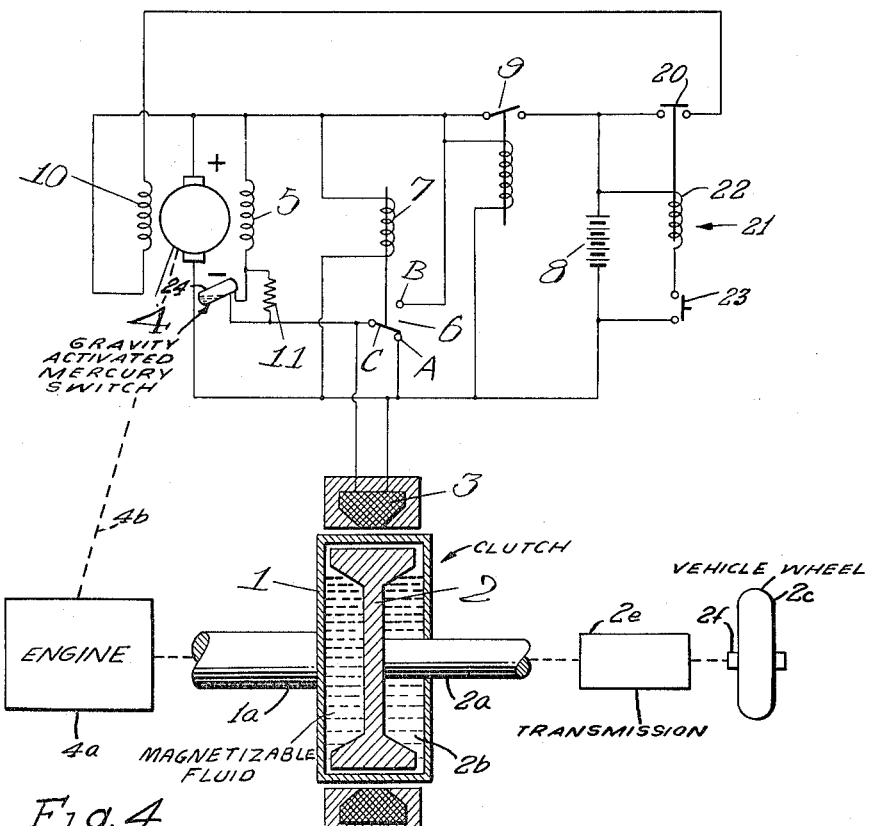
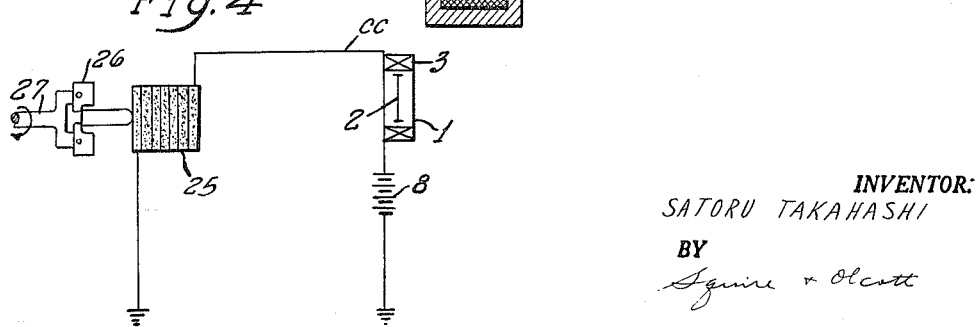

3,250,341
SYSTEM FOR CONTROLLING A MAGNETIC
FLUID CLUTCH AND GENERATOR OF A
MOTOR VEHICLE TRANSMISSION
Satoru Takahashi, Hamamatsu-shi, Shizuoka-ken, Japan, assignor to Suzuki Motor Co., Ltd., Shizuoka-ken, Japan, a corporation of Japan
Filed Aug. 31, 1961, Ser. No. 135,162
Claims priority, application Japan, Sept. 17, 1960, 35/38,926; Jan. 25, 1961, 36/2,383; May 6, 1961, 36/16,188
5 Claims. (Cl. 180—77)

The present invention relates to a clutch control system for automotive vehicles and more particularly to a system wherein the torque transmission through the clutch may be varied by changing the magnetizing force applied to a magnetic fluid which couples the driving and driven members of the clutch.

The system comprises a direct current generator driven by the propulsion engine of the vehicle. The armature or output voltage of the generator is controlled by a shunt field winding associated with a vibratory voltage regulator. The clutch includes an exciting winding which progressively increases the maximum amount of torque which may be transmitted through the clutch with correspondingly increasing current through the exciting winding.

The regulator has a movable vibratory contact which is engageable with either of two stationary contacts. At low engine speeds, the vibratory engagement with one of the stationary contacts alternately short-circuits the exciting winding or connects it in series with the generator field winding. As the engine speed increases, vibratory engagement with the other stationary contact of the regulator takes place and the exciting winding is alternately subjected to full generator output voltage or connected in series with the generator field winding. The current flow through the exciting winding of the clutch continues to increase with increasing engine speed, although at a slower rate, throughout the engine speed range within which the regulator operates to produce a constant output voltage from the generator.

In another embodiment of the invention, a carbon pile resistor is included in the energizing circuit for the clutch exciting winding and is controlled by a centrifugally operated speed responsive member to increase the torque transmitted through the clutch with increasing engine speed.

A mercury switch is optionally connected to increase the threshold or minimum engine speed at which the clutch exciting winding becomes energized. The mercury switch operates when the vehicle is inclined for climbing a hill and during acceleration. Only the higher torque which is available at higher engine speeds is thus initially transmitted through the clutch. This prevents stalling and provides the extra torque which is needed for hill climbing or rapid acceleration.

Various objects, features and advantages of the invention will more clearly appear from the description hereinafter to follow, reference being made to the accompanying drawings which show by way of example, some embodiments of the present invention, in which FIG. 1 is a schematic diagram illustrating an embodiment of the present invention.

FIG. 4 is a schematic diagram illustrating a modification wherein the exciting current supplied to the electromagnetic clutch is controlled by centrifugal force which is proportional to engine speed.

Figure 2:
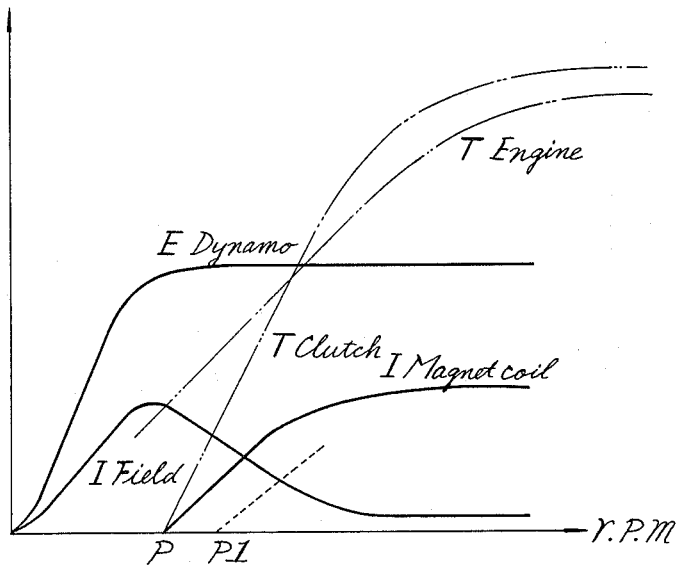
FIGS. 2 and 3 are graphs illustrating the operation of the invention.
Figure 3:
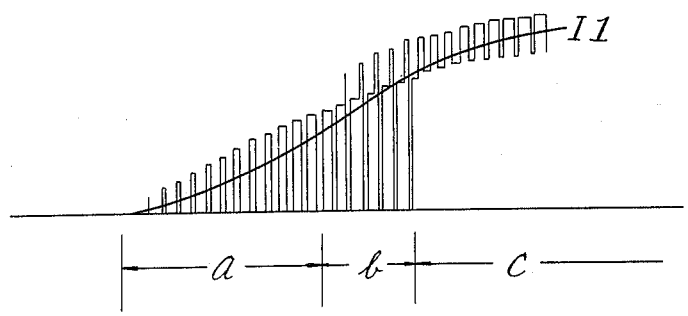

Referring now to the FIGS. 1, 2 and 3, 1 and 2 are driving and driven clutch members rotating with, and rigidly connected to, the driving and driven shafts 1a and 2a, respectively. These parts are coaxially aligned and engaged with each other by means of a magnetic fluid 2b confined in the small clearance between the clutch members 2 and 3. 3 is an annular exciting coil which supplies lines of magnetic force to the magnetic fluid 2b in the small clearance between the clutch members. The driven shaft 2a drives a vehicle wheel 2c of which the tire is shown in plan view, the wheel 2c being driven through a driving connection 2d which includes the usual transmission 2e driving the axle 2f of the wheel 2c.

Without magnetic flux through the magnetic medium 2a in the clearance, the members 1 and 2 are free from each other and one is able to rotate independently of the other because the magnetic medium is fluid; but, as direct current is supplied to the coil 3, the magnetic medium changes its fluidity and causes the driving torque to be transmitted from driving member 1 to the driven member 2. Such is a typical example of a suitable electromagnetic clutch. Another type of electromagnetic clutch is substantially the same as the conventional friction-disk clutch except that the force required to engage the disk is derived electromagnetically. The amount of torque transmitted under such a condition is approximately proportional to the strength of the magnetic field (and hence to the magnitude of exciting current in coil 3).

4 is the armature of a direct current generator driven directly from an engine 4a through conventional coupling means 4b shown as a dashed line; 5 is the field coil of generator 4; and 6 is a voltage regulator having a spring-loaded switch with two stationary contact points A and B. Point A which is the voltage adjusting point, is connected to the negative armature terminal through a movable contact C and remains in its closed position when the generator terminal voltage is lower than a predetermined minimum voltage (in this case, the battery voltage). With contacts A and C closed, the circuit is such that the field coil 5 is connected directly across the armature terminals of the generator and the exciting coil 3 of the clutch is short-circuited. Contact B is the shunt point and is engaged by movable contact C when the speed of the generator rises sufficiently high. When this closure occurs, the clutch exciting coil 3 becomes connected directly across the generator terminals and the field coil 5 becomes shunted out. In an ordinary direct current generator, an adjustment resistance is placed in the circuit which shunts the field winding of the dynamo and its resistance value is normally taken at a value approximately equal to that of the field coil 5 so that, as adjusting point A is made to open and close in rapid succession in a vibratory manner, the current through the circuit will be controlled smoothly and thus the contact points be enabled to provide an extended service life. Therefore, according to the present invention, it is preferable to make the resistance of the exciting coil 3 have a value approximately equal to that of the field coil 5.

In the drawing, 7 is a regulator solenoid; 8 is a battery; 9 is a cutout relay; and 10 is a starter field winding energized through contacts 20 of a starter relay 21. The starter relay 21 comprises an operating winding 22 controlled by a starter button 23.

In operation, when the engine speed rises, the voltage generated by armature 4 rises correspondingly and, consequently, the regulator solenoid 7 causes the circuit through adjusting point A to open. The current which was previously flowing through the field coil 5 now passes through the exciting coil 3; but at the instant when the contact point A opens, coil 3 becomes connected in series with coil 5, and, since coil 3 has a resistance equal to that of field winding 5, the field current is reduced by one half. This, in turn, reduces the output voltage of armature 4 and, hence, adjusting point A closes again because of the decreased magnetic pull of solenoid 7. This action is repeated continuously, with the contacting arm C touching on and separating from the point A, and, as the result, a vibratory contact closure occurs at point A. The amplitude of this vibration, which is the amount by which the contacting arm is displaced from point A toward point B, increases with the increasing engine speed. Such increases in the amplitude means that point A is, on an average, open for longer time than it is closed. When the engine speed increases still further, the amplitude becomes so large that the contact arm C reaches point B. Where this contact between arm C and point B takes place, the field coil 5 becomes short-circuited, discharging its energy and tending further to decrease the electromotive force of the generator 4. In other words, under such high engine-speed condition, the electromotive force is so great that the field current can no longer be controlled by means of the series adjusting resistance (as represented in this case by exciting coil 3), and therefore the field coil 5 of the generator is shunted out, giving the same effect as introduction of an infinitely large resistance into the field circuit. As soon as the field 5 is shunted out, the electromotive force decreases and the contact arm separates from shunt point B. Immediately following this opening, current begins to flow in the series circuit including the field coil 5 and the exciting coil 3 and, since the engine is assumed to be running at an extremely high speed, this again closes point B. This sequence repeats itself in such a manner that the contact arm touches on and separates from point B in a vibratory manner, and the amplitude of this vibratory motion decreases with the increasing engine speed. With point B closed, field coil 5 is shunted while exciting coil 3 is directly connected across the generator terminals, and the full terminal voltage is therefore directly impressed across this coil 3, the magnitude of this voltage being determined by the prevailing electromotive force and also by the proportions of opened time and closed time of the contact B as explained previously. With a further increase of the engine speed, the intervals of shunting the field coil become longer and consequently, the average current supplied to the exciting coil 3 of the clutch increases.

It may be summarized that the points A and B and the contact arm are all so conditioned that, as the engine speed rises, their operation tends to increase the amount of current supplied to the exciting coil 3, one effect superimposing upon the other, with the result that, where the engine keeps increasing its speed, the current supplied to the clutch exciting coil 3 rises sharply as is indicated in the graph of FIG. 2 wherein E, I and T indicate voltage, current and torque and T clutch represents the output torque obtained from the clutch. The point of origin P of the clutch current curve may be displaced to any other desired minimum engine speed, as at P1 for instance, by inserting an appropriate resistance 11 in series with the field coil 5. This series resistance is cut in or out of the circuit of field winding 5 by a mercury switch 24. The switch 24 is so arranged that it is opened by gravity in response to an uphill inclination of the vehicle. As a result, the resistor 11 then reduces the field current thereby requiring a higher engine speed to produce clutch engagement. This makes available an increased torque which accompanies the increased engine speed and which is desirable for hill climbing. The mercury switch 24 also opens in response to rapid acceleration of the vehicle. Again, the region of clutch engagement is shifted to a higher range of engine speeds so that the desired increased negine torque is transmitted through the clutch.

In FIG. 3, the mode of variation of the exciting current is shown. This average current I1 corresponds, of course, to the magnet coil current shown in FIG. 2. For the engine-speed region designated as $a$, the contact arm C is vibrating at the adjusting point A and the current, which is one half of what would flow through the field coil 5, increasingly flows in the exciting coil as hte engine speed is increased and, likewise, the intervals of supplying this current become longer. For the engine speed region designated as $b$, the contact arm C vibrates between the contacts A and B, and the maximum instantaneous current is greater than in the $a$ region. This $b$ region may be of negligible extent. For the region designated as $c$, the contact arm is touching shunt point $b$ intermittently for intervals of appreciable duration and the field current and the full output voltage of armature 4 are alternately supplied to the exciting coil 3.

Referring to FIG. 4, instead of being associated with the voltage regulator, the clutch exciting winding 3 is connected to the constant voltage battery 8 in series with a carbon pile resistor 25. The carbon pile resistor 25 is compressed by a centrifugal device 26 driven by a shaft 27. The shaft 27 is driven along with the clutch member 1 by the engine 4a (FIG. 1).

As the engine speed increases, the resistance of the carbon pile resistor 25 decreases whereby the current flow in exciting winding 3 increases and the torque transmitted through the clutch 1, 2 increases.

The operational characteristics of the centrifugal device 26 and carbon pile resistor 25 are dimensioned to provide the desired correlation between torque transmitted through the clutch 1, 2 and the speed of the engine.

While I have shown and described what I believe to be the best embodiments of my invention, it will be apparent to those skilled in the art that various changes and modifications may be made therein without departing from the spirit and scope of the invention as defined in the appended claims.

What I claim is:

1. A clutch control system for a vehicle comprising an engine; clutch means comprising a driving clutch member connected to be driven by said engine and a driven clutch member connected to drive a wheel of said vehicle; electromagnetic means including an exciting winding for producing progressively increasing torque transmission from said driving member to said driven member accompanying progressively increasing current flow through said exciting winding, an energizing circuit for said exciting winding; a carbon pile resistor included in said energizing circuit; and pressure applying means acting on said resistor, said pressure applying means including a centrifugally actuated speed responsive member driven by said engine and applying increasing compressive force to said resistor accompanying increasing engine speed, said resistor being included in said enerfiizing circuit for progressively increasing current flow through said exciting winding in response to progressively increasing speed of said engine.

2. A clutch control system for a vehicle comprising: an engine; a direct current generator driven by said engine, said generator including an armature winding and a shunt field winding; clutch means comprising a driving clutch member connected to be driven by said engine and a driven clutch member connected to drive a wheel of said vehicle; electromagnetic means including an exciting winding for producing progressively increasing torque transmission from said driving member to said driven member accompanying progressively increasing direct current flow through said exciting winding; electromagnetic vibrator means comprising a movable contact and first and second stationary contacts selectively engageable by said movable contact, said vibrator means comprising an operating winding connected across said armature winding, said movable contact being yieldingly urged into engagement with said first contact and away from said second contact with said operating winding deenergized, said movable contact being disengageable from said first contact when a predetermined minimum energizing potential is applied to said operating winding and engageable with said second contact when a potential exceeding said minimum potential is applied to said operating winding; circuit means connected said exciting winding between said movable contact and said first contact; and further circuit means connecting said shunt field winding between said movable contact and said second contact, said first and second contacts being connected across said armature winding.

3. A clutch control system according to claim 2, in which said clutch means comprises means defining a gap between said driving and driven members and a magnetizable fluid confined within said gap; said electromagnetic means causing magnetization of said fluid in response to current flow through said exciting winding.

4. A clutch control system according to claim 2, further comprising a resistor connected in series with said shunt field winding and switch means for selectively short-circuiting said resistor.

5. A clutch control system according to claim 4, wherein said switch means comprises a mercury switch adapted to close in response to an uphill inclination of said vehicle.

References Cited by the Examiner
UNITED STATES PATENTS

| | | | |
|---|---|---|---|
| Re. 24,608 | 2/1959 | Winther | 192—21.5 |
| 1,794,613 | 3/1931 | Heany. | |
| 2,030,673 | 2/1936 | Wunsche | 310—94 X |
| 2,467,968 | 4/1949 | Critchfield et al. | 310—95 X |
| 2,498,793 | 2/1950 | Critchfield et al. | 310—94 X |
| 2,513,521 | 7/1950 | Sampietro et al. | 192—103 X |
| 2,684,138 | 7/1954 | Buckman | 192—21.5 |
| 2,896,757 | 7/1959 | Palys | 192—103 X |
| 2,974,769 | 3/1961 | Henderson | 192—103 |

BENJAMIN HERSH, *Primary Examiner.*

MILTON O. HIRSHFIELD, *Examiner.*

E. E. PORTER, *Assistant Examiner.*